(12) United States Patent
Gomes et al.

(10) Patent No.: US 9,381,794 B2
(45) Date of Patent: Jul. 5, 2016

(54) TONNEAU COVER SYSTEM

(71) Applicant: GM GLOBAL TECHNOLOGY OPERATIONS LLC, Detroit, MI (US)

(72) Inventors: Gerald J. Gomes, Macomb, MI (US); Sarah A Squier Ykema, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/529,398

(22) Filed: Oct. 31, 2014

(65) Prior Publication Data
US 2016/0121704 A1 May 5, 2016

(51) Int. Cl.
*B60J 7/16* (2006.01)
*B60P 7/02* (2006.01)
*B60P 7/08* (2006.01)
*B60P 7/06* (2006.01)

(52) U.S. Cl.
CPC ............... *B60J 7/1607* (2013.01); *B60P 7/02* (2013.01); *B60P 7/06* (2013.01); *B60P 7/0815* (2013.01)

(58) Field of Classification Search
CPC .......... B60J 7/16; B60J 7/1607; B60J 7/1614; B60P 7/02; B60P 7/06; B60P 7/08; B60P 7/0807; B60P 7/0815
USPC .............. 296/100.01, 100.02, 100.06, 100.07
See application file for complete search history.

(56) References Cited

U.S. PATENT DOCUMENTS

| | | | | |
|---|---|---|---|---|
| 3,512,828 A | * | 5/1970 | Craft | B60P 3/34 296/100.07 |
| 3,877,671 A | * | 4/1975 | Underwood | B61D 45/002 248/346.03 |
| 6,514,021 B2 | * | 2/2003 | Delay | B62D 25/2054 410/104 |
| 6,846,140 B2 | * | 1/2005 | Anderson | B60P 7/0815 410/102 |
| 7,874,774 B2 | * | 1/2011 | Peterson | B60P 7/0815 410/104 |
| 9,056,580 B2 | * | 6/2015 | Baldsiefen | B60Q 3/06 |

* cited by examiner

*Primary Examiner* — Jason S Daniels
(74) *Attorney, Agent, or Firm* — Quinn Law Group, PLLC

(57) ABSTRACT

A tonneau cover system includes at least one tonneau panel configured to be coupled to a pickup bed. The tonneau panel includes a panel body. The panel body includes a first panel wall and a second panel wall opposite the first panel wall. The tonneau panel defines at least one open slot extending through the first panel wall. The open slot includes a channel and an opening in communication with the channel. The channel has a width that is greater than the width of the opening. The open slot is configured to securely receive a cargo attachment.

15 Claims, 3 Drawing Sheets

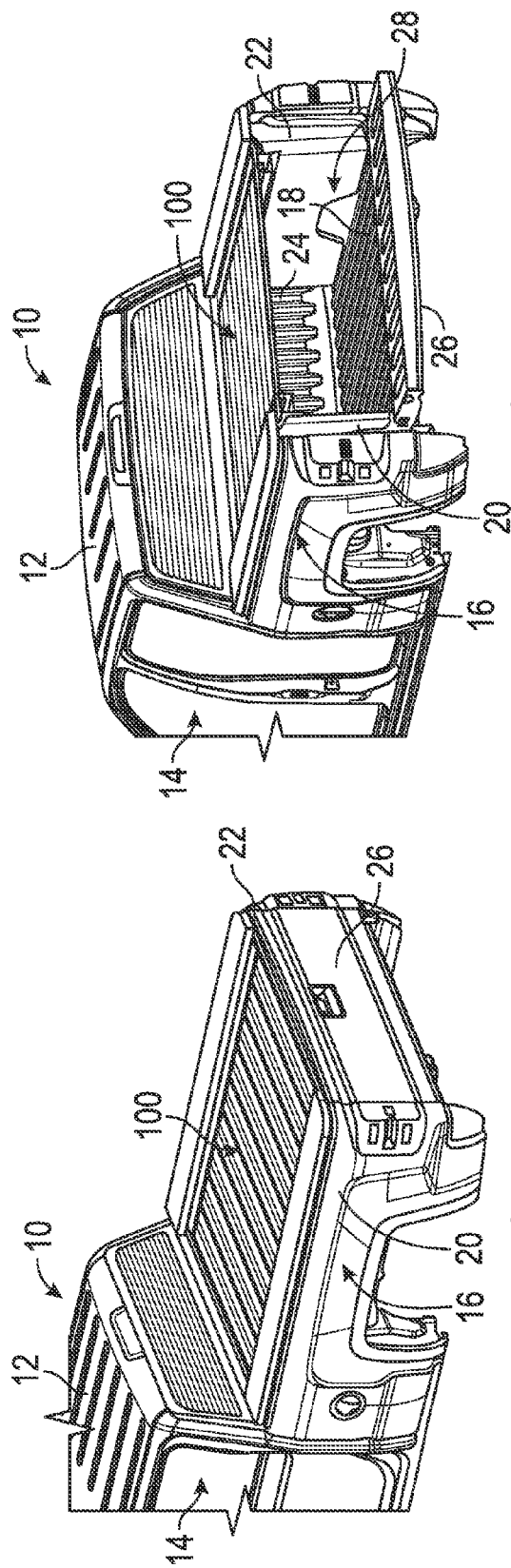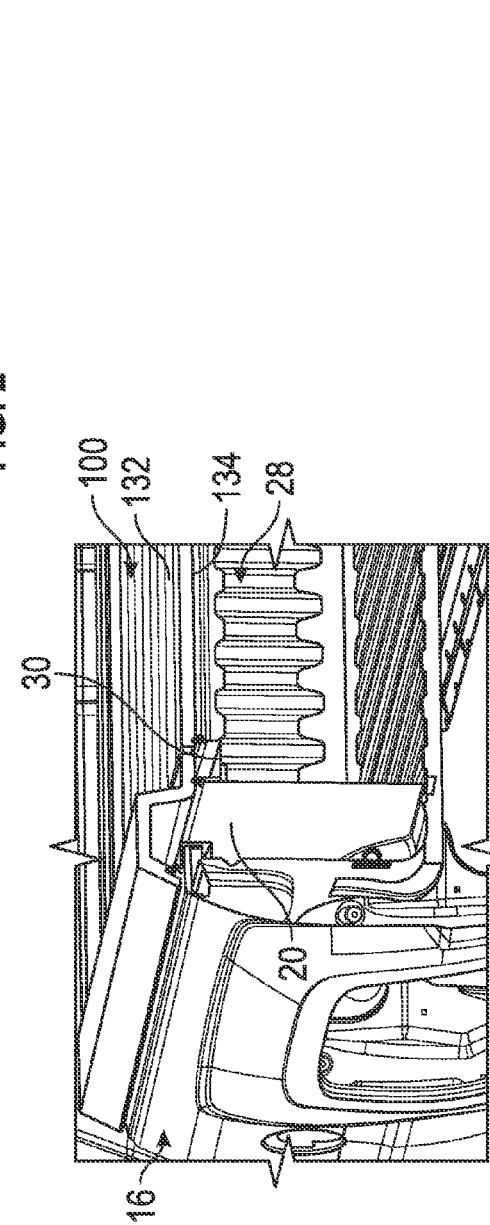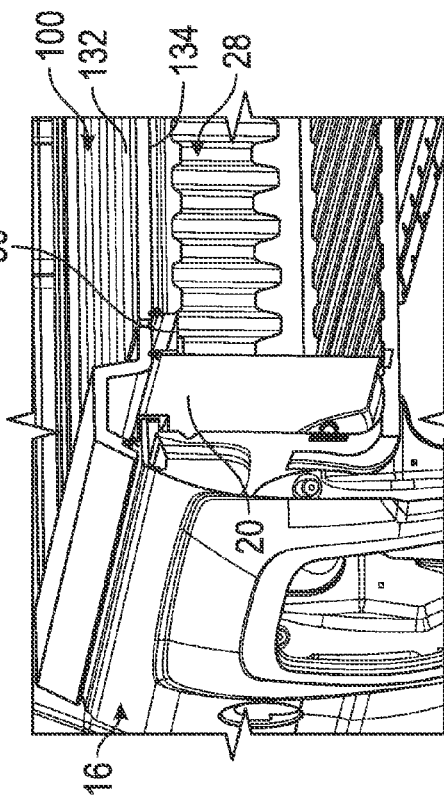

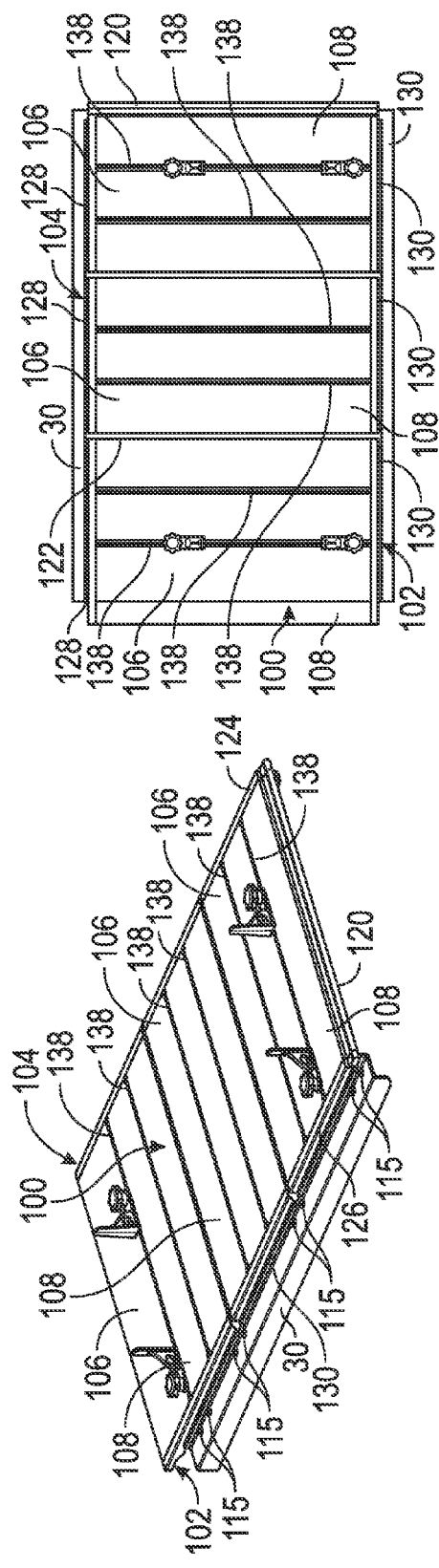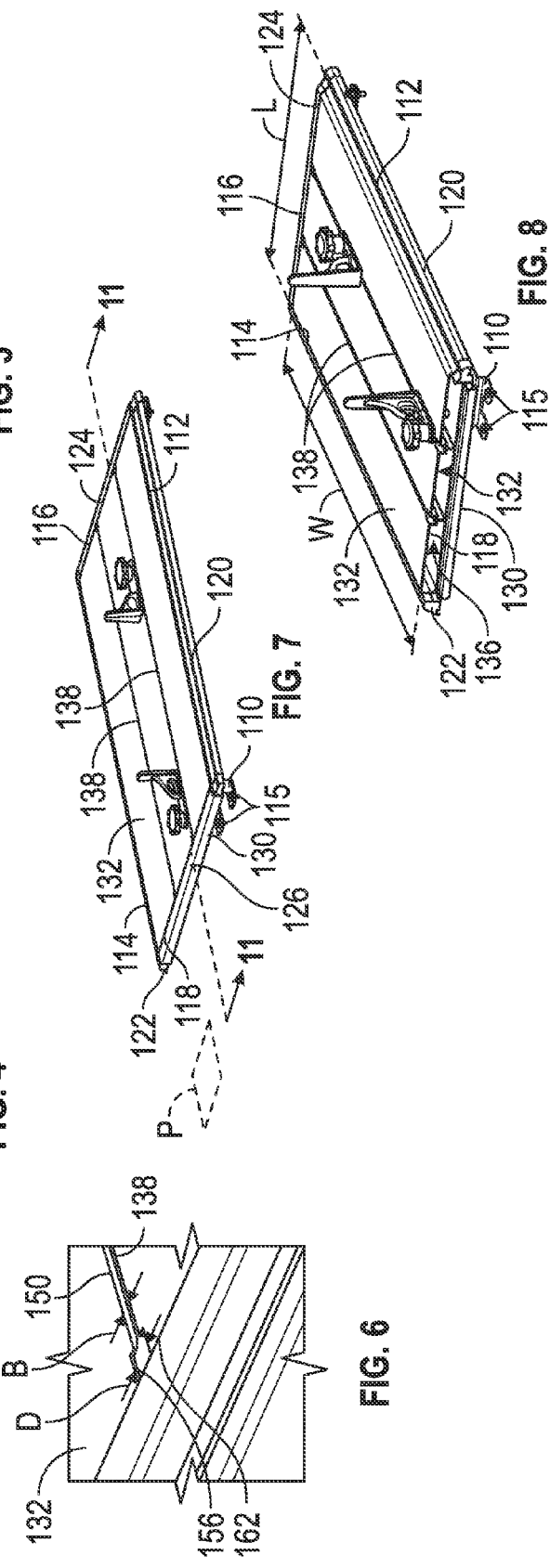

TONNEAU COVER SYSTEM

TECHNICAL FIELD

The present application relates to a tonneau cover system for covering the bed of a vehicle.

BACKGROUND

Some vehicles, such as pickup trucks, include an open-top, cargo area commonly known as a bed. Cargo can be placed in the bed, and the bed may be covered to protect the cargo from the elements (e.g., rain).

SUMMARY

The presently disclosed tonneau cover system can cover the bed of a vehicle and can support other objects. In one embodiment, the tonneau cover system includes at least one tonneau panel configured to be coupled to the pickup bed. The tonneau panel includes a panel body. The panel body includes a first panel wall and a second panel wall opposite the first panel wall. The tonneau panel defines at least one open slot, such as a T-slot, extending through the first panel wall. The open slot has a channel and an opening in communication with the channel. The width of the channel is greater than the width of the opening. The open slot is configured to securely receive a cargo attachment. The present disclosure also relates to vehicles including the tonneau cover system described above.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, perspective view of a vehicle including a bed for storing cargo and a tonneau cover system for covering the bed, depicting the tailgate in a closed position;

FIG. 2 is a schematic, perspective view of the vehicle shown in FIG. 1, depicting the tailgate in an open position;

FIG. 3 is a schematic, fragmentary, cross-sectional view of the vehicle shown in FIG. 1;

FIG. 4 is a schematic, perspective view of a tonneau cover system;

FIG. 5 is a schematic, top view of the tonneau cover system shown in FIG. 4;

FIG. 6 is a schematic, fragmentary, perspective view of the tonneau over system shown in FIG. 4;

FIG. 7 is a schematic, perspective view of a tonneau panel of the tonneau cover system shown in FIG. 4;

FIG. 8 is a schematic, perspective view of the tonneau panel shown in FIG. 5, without a beam configured to cover the side of the tonneau panel;

DETAILED DESCRIPTION

Figure 9:
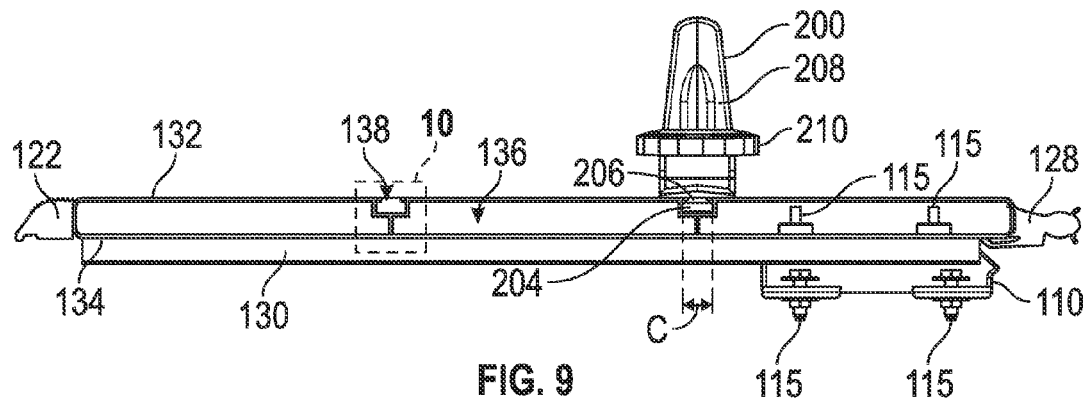
FIG. 9 is a schematic, side view of the tonneau panel shown in FIG. 5, without the beam configured to cover the side of the tonneau panel.

Referring to the drawings, wherein like reference numbers correspond to like or similar components throughout the several figures, and beginning with FIGS. 1 and 2 illustrate a vehicle 10, such as a pickup truck. The vehicle 10 includes a vehicle body 12 defining a closed, passenger compartment 14 and an open, cargo compartment commonly known as a bed 16 (which may also be referred to as a pickup bed). The bed 16 can hold cargo and includes a bed base 18 (or bottom bed wall), a first bed sidewall 20, a second bed sidewall 22 opposite the first bed sidewall 20, an interior bed wall 24, and a tailgate 26 opposite the interior bed wall 24. The tailgate 26 is movably coupled to the vehicle body 12. As such, the tailgate 26 can move relative to the vehicle body 12 and the bed base 18 between an open position (FIG. 2) and a closed position (FIG. 1). For instance, the tailgate 26 can be pivotally coupled to the first bed sidewall 20 and the second bed sidewall 22. The first bed sidewall 20, the second bed sidewall 22, the interior bed wall 24, and the tailgate 26 collectively define a bed cavity 28 of the bed 16.

With reference to FIGS. 1, 2, and 3, a tonneau cover system 100 can be removably coupled to the bed 16 to cover its top in order to protect cargo inside the bed cavity 28 from the elements (e.g., rain). The tonneau cover system 100 can be selectively coupled to the first bed sidewall 20 and the second bed sidewall 22 of the bed 16 using bolts, welding, or any other suitable method or mechanism. Further, the tonneau cover system 100 may be deemed part of the vehicle 10.

With reference to FIGS. 3, 4, and 5, a pair of coupling brackets 30 can be attached to opposing sides of the tonneau cover system 100 in order to couple the tonneau cover system 100 to the bed 16. The tonneau cover system 100 has a first system side 102 and a second system side 104 opposite the first system side 102. One coupling bracket 30 is attached to the first system side 102, and another coupling bracket 30 is attached to the second system side 104 as discussed in detail below. Each coupling bracket 30 is coupled to the bed 16. Specifically, the first bed sidewall 20 is coupled to one coupling bracket 30, and the second bed sidewall 22 is coupled to another coupling bracket 30. As such, each coupling bracket 30 interconnects the bed 16 and the tonneau cover system 100. As a non-limiting example, the coupling brackets 30 can be welded or bolted to the first bed sidewall 20 and the second bed sidewall 22.

With reference to FIGS. 4-8, in the depicted embodiment, the tonneau cover system 100 includes a plurality of interconnected tonneau panels 106. However, it is contemplated that the tonneau cover system 100 may be configured as a one-piece structure or a single, unitary tonneau panel 106. The coupling brackets 30 can interconnect the tonneau panels 106. The tonneau panels 106 may be formed via extrusion.

Each tonneau panel 106 is made of a substantially rigid material, such as aluminum, and includes a panel body 108 and a panel bracket 110 coupled to the panel body 108. It is useful to make the tonneau panels 106 of a substantially rigid material so that the tonneau cover system 100 can bear the weight of an object, such as a bike rack, cargo, a kayak carrier, among other things. Although made of a substantially rigid material, each tonneau panel 106 can be substantially hollow in order to minimize costs. The panel body 108 may have a substantially planar shape and, therefore, extends along a plane P. The substantially planar shape of the panel body 108 helps the tonneau panel 106 to bear a load, such as the weight of cargo, and prevents cargo from sliding along the tonneau panel 106.

Fasteners 115, such as bolts, can extend through the panel bracket 110 and the tonneau panel 106 to couple the panel bracket 110 to the tonneau panel 106 (see FIG. 9). Further, fasteners 115, such as bolts, can extend through the panel brackets 110 and the coupling brackets 30 in order to couple the tonneau panels 106 to the coupling brackets 30. The coupling brackets 30 are then coupled (e.g., welded or bolted) to the first bed sidewall 20 and the second bed sidewall 22 in order to couple the tonneau panels 106 to the bed 16 (see FIG. 3).

With reference to FIGS. 7 and 8, each panel body 108 may be substantially rectangular and defines a first edge 112, a second edge 114 opposite the first edge 112, a third edge 116 perpendicular to the first edge 112 and the second edge 114, and a fourth edge 118 opposite the third edge 116. The third edge 116 and the fourth edge 118 extend from the first edge 112 to the second edge 114. The substantially rectangular shape of the tonneau panels 106 allows the tonneau cover system 100 to cover the open top of the bed 16. Each panel body 108 has a length L (FIG. 8) extending from the first edge 112 to the second edge 114, and a width W extending from the third edge 116 to the fourth edge 118.

A first impermeable seal 120 is coupled along the entire first edge 112 of the panel body 108 in order to prevent liquids or gases from entering the bed cavity 28 (FIG. 2). The first impermeable seal 120 is made of a substantially flexible and polymeric material. As such, the first impermeable seal 120 can be liquid-impermeable (e.g., watertight) and/or gas-impermeable (e.g., airtight) depending on the specific polymer material employed.

A second impermeable seal 122 is coupled along the entire second edge 114 of the panel body 108 in order to prevent liquids or gases from entering the bed cavity 28 (FIG. 2). The second impermeable seal 122 is made of a substantially flexible and polymeric material. As such, the second impermeable seal 122 can be liquid-impermeable (e.g., watertight) and/or gas-impermeable (e.g., airtight) depending on the specific polymer material employed.

A first beam 124 is coupled along the entire third edge 116 of the panel body 108, and a second beam 126 is coupled along the entire fourth edge 118 of the panel body 108. The first beam 124 and the second beam 126 enhance the structural integrity of the tonneau panel 106. A third impermeable seal 128 is coupled to the first beam 124, and the fourth impermeable seal 130 is coupled to the second beam 126. Each of the third and fourth impermeable seals 128, 130 are made of a substantially flexible and polymeric material. As such, the third and fourth impermeable seals 128, 130 can be liquid-impermeable (e.g., watertight) and/or gas-impermeable (e.g., airtight) depending on the specific polymer material employed.

Figure 10:
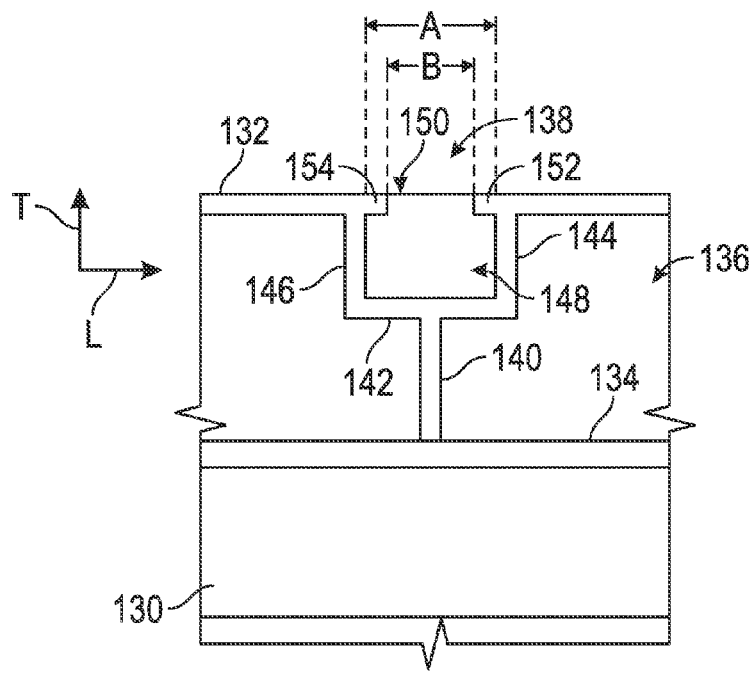
FIG. 10 is a schematic, fragmentary side view of the tonneau panel shown in FIG. 5, taken around area 10 of FIG. 9.
Figure 11:
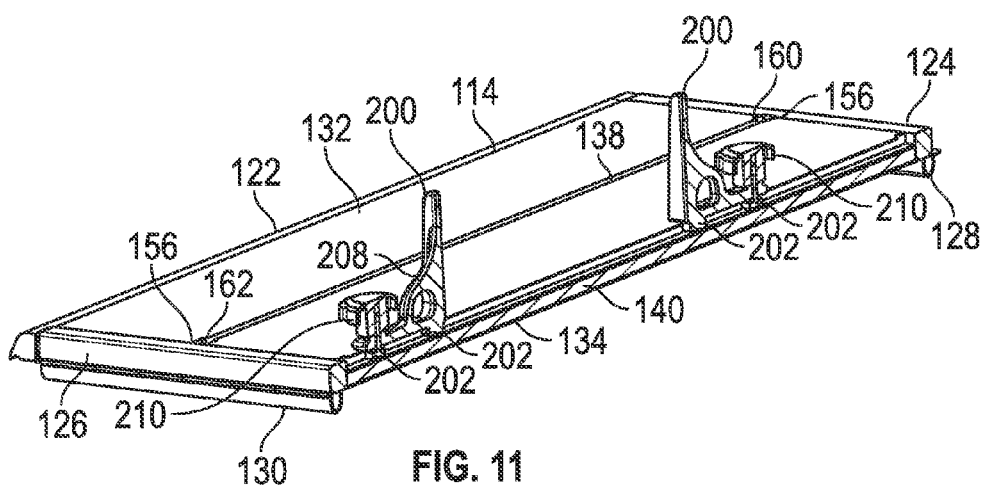
FIG. 11 is a schematic, cross-sectional perspective view of the tonneau panel shown in FIG. 5, taken along section line 11-11 of FIG. 7.

With reference to FIGS. 9, 10, and 11, the panel body 108 also includes a first or top panel wall 132 and a second or bottom panel wall 134 (see also FIG. 3) opposite the first panel wall 132. The second panel wall 134 is closer to the bed base 18 than the first panel wall 132. As discussed above, each tonneau panel 106 can be substantially hollow and therefore defines an inner panel channel 136 between the first panel wall 132 and the second panel wall 134.

Each tonneau panel 106 has at least one open slot 138 extending along its entire width W. In the depicted embodiment, each tonneau panel has two open slots 138, but it is contemplated that the tonneau panels 106 may have fewer or more slots 138. As discussed in detail below, each open slot 138 is configured, shaped, and sized to partially receive a cargo attachment 200, such as bike rack, a kayak carrier, or any suitable support. The cargo attachment 200 can also be cargo. The open slots 138 are parallel to the first edge 112, the second edge 114 and to one another, and each open slot 138 extends into the first panel wall 132 from the third edge 116 to the fourth edge 118 along the entire width W of the panel body 108. The cargo attachment 200 may be part of the tonneau cover system 100.

Each open slot 138 may be a T-slot (as described in detail below) and is therefore capable of securely receiving at least a portion of the cargo attachment 200 (FIG. 9) in order to couple the cargo attachment 200 to the tonneau cover system 100. The panel body 108 includes a support column 140 disposed within the inner panel channel 136 and directly coupled to the second panel wall 134. The support column 140 is substantially perpendicular to the first panel wall 132 and the second panel wall 134 in order to help support the cargo attachment 200 partially disposed in the open slot 138.

The support column 140 is directly coupled to a support wall 142, which partially defines the open slot 138. The support wall 142 is substantially perpendicular to the support column 140 in order to the support the cargo attachment 200 disposed in the open slot 138. Accordingly, the support wall 142 is substantially parallel to the first panel wall 132 and the second panel wall 134 in order to maintain the cargo attachment 200 steadily connected to the panel body 108.

Each open slot 138 is partially defined by a first lateral wall 144 and a second lateral wall 146 opposite the first lateral wall 144. The first lateral wall 144 and the second lateral wall 146 are substantially parallel to each other and to the support column 140 in order to maintain a steady connection between the panel body 108 and the accessary 200 when the cargo attachment 200 is partially disposed in the open slot 138.

The first lateral wall 144, the second lateral wall 146, and the support wall 142 collectively define a channel 148 of the open slot 138. The channel 148 has a width A (i.e., the first width) extending from the first lateral wall 144 to the second lateral wall 146 along a lateral direction L.

Each open slot 138 further includes an opening 150 extending through the first panel wall 132 along a transverse direction T, which is perpendicular to the lateral direction L. The opening 150 is defined by a first lip 152 and a second lip 154 both extending laterally from the first panel wall 132. The second lip 154 is spaced from the first lip 152 along the lateral direction L so as to define the opening 150. The opening 150 is in communication with the channel 148 and has a width B (i.e., the second width) extending from the second lip 154 to the first lip 152 along the lateral direction L. The width A of the channel 148 is greater than the width B of the opening 150 in order to allow the cargo attachment 200 to be securely disposed in the open slot 138.

The cargo attachment 200 may be a support and is wholly or partly made of a substantially rigid material to allow it to support another object. For instance, the cargo attachment 200 may be made of aluminum or any other suitable metallic material. In the depicted embodiment, the cargo attachment 200 functions as a support and includes at least one coupling pin 202 configured, shaped, and sized to be securely disposed in the open slot 138. Although the drawings show that each cargo attachment 200 includes two coupling pins 202, the cargo attachment 200 may include more or fewer couplings pins 202. Each coupling pin 202 includes a first pin portion 204 and a second pin portion 206 directly connected to the first pin portion 204. The first pin portion 204 is larger than the second pin portion 206 (FIG. 9) and is configured, shaped, and sized to be tightly and securely received in the channel 148 of the open slot 138. The second pin portion 206 is configured, shaped, and sized to be tightly and securely received in the opening 150. The width C of the first pin portion 204 (FIG. 9) is greater than the width A of the opening 150 in order to secure the first pin portion 204 in the channel 148.

The cargo attachment 200 further includes a main body 208 coupled to the coupling pins 202. The main body 208 can support other objects, such as a kayak. The cargo attachment 200 may further include a knob 210 movably coupled to at least one of the coupling pins 202. The knob 210 can be used to tighten one of the coupling pins 202 in the open slot 138.

With reference to FIGS. 6 and 11, each open slot 138 has at least one access opening 156 for allowing the first pin portion 204 to be initially disposed in the channel 148. In the depicted embodiment, each open slot 138 has an access opening 156 disposed at its first slot end 160 and second slot end 162. Each access opening 156 has a width D that is greater than the width B of the opening 150 but equal to or greater than the width A of the channel 148 (FIG. 10) in order to allow the coupling pin 202 to be secured in the open slot 138.

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising:
a bed including a first bed sidewall, a second bed sidewall opposite the first bed sidewall, a bed base coupled between the first and second bed sidewalls, wherein the first bed sidewall, the second bed sidewall, and the bed base collectively define a bed cavity;
a tonneau panel coupled to the bed between the first and second bed sidewalls so as to cover the bed cavity, wherein the tonneau panel includes a panel body, the panel body includes a first panel wall and a second panel wall opposite the first panel wall, wherein the second panel wall is closer to the bed than the first panel wall, the tonneau panel defines at least one open slot extending through the first panel wall, the panel body defines a first edge, a second edge opposite the first edge, a third edge between the first and second edge, and a fourth edge opposite the third edge, the panel body has a body length extending from the first edge to the second edge, the panel body has a body width extending from the third edge to the fourth edge, the tonneau panel includes a first impermeable seal coupled along an entirety of the first edge of the panel body and a second impermeable seal coupled along an entirety of the second edge of the panel body, the panel body includes a support wall partially defining the at least one open slot, the panel body includes a support column coupled directly to the second panel wall and the support wall, the support column is perpendicular to the first panel wall and the second panel wall, the tonneau panel includes a first beam coupled along an entirety of the third edge of the panel body and a second beam coupled along an entirety of the fourth edge of the panel body, and the tonneau panel includes a third impermeable seal coupled to the first beam and a fourth impermeable seal coupled to the second beam;
wherein the at least one open slot includes a channel and an opening in communication with the channel, the channel has a first width, the opening has a second width, and the first width is greater than the second width, the at least one open slot extends from the third edge to the fourth edge, and the at least one open slot extends along an entirety of the body width; and
a cargo attachment including a main body and at least one coupling pin coupled to the main body, wherein the at least one coupling pin is securely received in the at least one open slot, and the cargo attachment includes a knob movably coupled to at least one coupling pin such that rotation of the knob tightens the at least one coupling pin in the open slot.

2. The vehicle of claim 1, wherein the panel body includes a first lateral wall and a second lateral wall opposite the first lateral wall, the first lateral wall and the second lateral wall are perpendicular to the support wall, and the support wall, the first lateral wall, and the second lateral wall collectively define the channel, the vehicle includes a coupling bracket coupled to the panel body, and the coupling bracket is directly coupled to the first bed sidewall.

3. The vehicle of claim 2, wherein the first width extends from the first lateral wall to the second lateral wall along a lateral direction, the tonneau panel includes a panel bracket coupled to the panel body, and the tonneau panel includes at least one fastener extending through the panel bracket and the coupling bracket.

4. The vehicle of claim 3, wherein the panel body further includes a first lip and a second lip, the first lip and the second lip protrudes from the first panel wall, and the second lip is spaced apart from the first lip along the lateral direction.

5. The vehicle of claim 4, wherein the second width is defined from the first lip to the second lip along the lateral direction.

6. The vehicle of claim 5, wherein the at least one open slot includes at least one access opening extending through the first panel wall, the at least one access opening having a third width that is greater than the second width.

7. The vehicle of claim 6, wherein the at least one open slot defines a first slot end and a second slot end opposite the first slot end, the first slot end is disposed at the third edge of the panel body, the second slot end is disposed at the fourth edge of the panel body, and the at least one access opening includes a first access opening and a second access opening, the first access opening is disposed at the first slot end, the second access opening is disposed at the second slot end, the first access opening is disposed at the third edge of the panel body, and the second access opening is disposed at the fourth edge of the panel body.

8. The vehicle of claim 7, wherein the third width is equal to or greater than the first width.

9. A tonneau cover system for covering a pickup bed, comprising:
at least one tonneau panel configured to be coupled to the pickup bed, wherein the at least one tonneau panel includes a panel body, the panel body includes a first panel wall and a second panel wall opposite the first panel wall, the panel body includes a first lip and a second lip, the first lip and the second lip protrudes from the first panel wall, and the second lip is spaced apart from the first lip along a lateral direction, and the tonneau panel defines at least one open slot extending through the first panel wall; and
wherein the at least one open slot includes a channel having an opening, and the at least one open slot is configured to securely receive a cargo attachment, the opening has a width defined from the first lip to the second lip along the lateral direction, the at least one open slot defines a first terminus and a second terminus opposite the first terminus, the at least one open slot includes at least one access opening extending through the first panel wall, the at least one access opening is disposed at the first terminus, and a width of the at least one access opening is greater than the width of the opening.

10. The tonneau cover system of claim 9, wherein the panel body defines a first edge, a second edge opposite the first edge, a third edge between the first and second edge, and fourth edge opposite the third edge, the at least one open slot extends from the third edge to the fourth edge, the panel body has a body length extending from the first edge to the second edge, the panel body has a body width extending from the third edge to the fourth edge, and the at least one open slot extends along an entirety of the body width.

11. The tonneau cover system of claim 9, wherein the panel body includes a support wall partially defining the at least one open slot, and a support column coupled directly to the second panel wall and support wall.

12. The tonneau cover system of claim 11, wherein the panel body includes a first lateral wall and a second lateral wall opposite the first lateral wall, the first lateral wall and the second lateral wall are perpendicular to the support wall, and the support wall, the first lateral wall, and the second lateral wall collectively define the channel.

13. The tonneau cover system of claim 12, wherein the channel has a channel width extending from the first lateral wall to the second lateral wall along the lateral direction.

14. The tonneau cover system of claim 13, wherein the channel width is greater than the width of the opening.

15. The tonneau cover system of claim 14, wherein the width of the access opening is equal to or greater than the channel width.

* * * * *